(12) United States Patent
Brissette et al.

(10) Patent No.: US 9,619,315 B1
(45) Date of Patent: Apr. 11, 2017

(54) NETWORK FAILURE TRIAGE ASSISTED BY EMBEDDED AGENTS

(71) Applicant: Cisco Technology, Inc., San Jose, CA (US)

(72) Inventors: Patrice Brissette, Kanata (CA); Mike R. E. Mallin, Kanata (CA); Ianik Semco, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 14/524,155

(22) Filed: Oct. 27, 2014

(51) Int. Cl.
  *G06F 11/07* (2006.01)
(52) U.S. Cl.
  CPC ........ *G06F 11/079* (2013.01); *G06F 11/0709* (2013.01)
(58) Field of Classification Search
  CPC .......................... G06F 11/079; G06F 11/0709
  See application file for complete search history.

(56) References Cited

U.S. PATENT DOCUMENTS

| | | | | |
|---|---|---|---|---|
| 7,080,141 B1* | 7/2006 | Baekelmans | ....... | G06F 11/0709 709/202 |
| 7,296,194 B1* | 11/2007 | Lovy | ................ | G06F 11/0709 709/224 |
| 2003/0056140 A1* | 3/2003 | Taylor | ................ | G06F 11/0709 714/4.1 |
| 2005/0210331 A1* | 9/2005 | Connelly | ............ | G06F 11/0709 714/26 |
| 2007/0192400 A1* | 8/2007 | Lee | .................. | G06F 11/0709 709/202 |
| 2008/0209255 A1* | 8/2008 | Seguin | ............... | G06F 11/0748 714/2 |
| 2009/0164853 A1* | 6/2009 | Gokhale | ............ | G06F 11/0709 714/57 |
| 2009/0183029 A1* | 7/2009 | Bethke | ............... | G06F 11/0709 714/26 |
| 2010/0318846 A1* | 12/2010 | Sailer | ................ | G06F 11/0748 714/26 |
| 2011/0060946 A1* | 3/2011 | Gupta | ................ | G06F 11/0709 714/26 |
| 2011/0185220 A1* | 7/2011 | Foley | ................ | G03G 15/5079 714/2 |
| 2014/0114613 A1* | 4/2014 | Wang | ................ | G05B 23/0205 702/185 |

OTHER PUBLICATIONS

EG Innovations, "Proactive IT Triage™: Automation of ITSM-Based Problem Management", Feb. 2005, http://www.eginnovations.com/whitepaper/ITSMwhitepaper.pdf, 10 Pages.

(Continued)

*Primary Examiner* — Yolanda L Wilson
(74) *Attorney, Agent, or Firm* — Edell, Shapiro & Finnan, LLC

(57) ABSTRACT

A method is provided for performing first line triage of network issues after receiving an indication of an error in a computer network. At least one software agent in a network element of the computer network is queried. The software agent(s) are embedded in the source code for processes running on the network element. Data from the software agent(s) are received in response to the query.

21 Claims, 5 Drawing Sheets

(56) References Cited

OTHER PUBLICATIONS

EG Innovations, "The eG Suite: Enabling Real-Time Monitoring and Proactive Infrastructure Triage™, White Paper", May 2004, http://www.eginnovations.com/whitepaper/triage-whitepaper.pdf, 12 Pages.
Amershi et al., "CueT: Human-Guided Fast and Accurate Network Alarm Triage", May 2011, http://research.microsoft.com/en-us/um/people/ratul/papers/chi2011-cuet.pdf, 10 Pages.

\* cited by examiner

NETWORK FAILURE TRIAGE ASSISTED BY EMBEDDED AGENTS

TECHNICAL FIELD

The present disclosure relates to troubleshooting errors in computer networking.

BACKGROUND

First line support for complex computer networks typically requires significant human engineering resources. When an issue is found, a first line engineer logs on to the affected network, connects to the appropriate network elements, collects information from each network elements (e.g., via "show" commands), and begins debugging. Usually, the first line engineer will go to a Transfer of Information (TOI) presentation and consult internal informational postings to perform a first line triage and identify the issue and the internal engineering team(s) responsible for solving the issue.

The information collected from the affected network elements in the first line triage is typically sent to the responsible internal engineering team(s) for a second line triage. In the second line triage process, someone from that team will scan the collected data to understand the issue. In some cases, that person may involve other internal teams when the issue is not in their area of responsibility, or relates to interactions between different modules in the system.

DESCRIPTION OF EXAMPLE EMBODIMENTS

Overview

A method is provided for performing first line triage of network issues after receiving an indication of an error in a computer network. At least one software agent in a network element of the computer network is queried. The software agent(s) are embedded in the source code for processes running on the network element. Data from the software agent(s) are received in response to the query.

Example Embodiments

As computer networks increase in complexity, troubleshooting issues and errors consume increasing amounts of time and resources. The techniques presented herein describe a "What Is Going On" (WIGO) system that addresses the first line support done by engineering teams in determining the source of a networking issue, and directing the issue to the appropriate teams responsible for handling the issue. In one example, the WIGO system removes the need for human intervention, domain specific knowledge, debugging and/or wiki pages of the first line triage though an intelligent algorithm.

The WIGO system performs the first line triage analysis on its own and may display the results of its analysis directly on an affected network element. In another example, the results may be sent to a remote server in the WIGO system for triage processing. The results of the triage processing may be sent to the appropriate engineering team for a root-cause analysis in order to fix the issue. In one example, the WIGO system may additionally suggest how to fix the issue. To achieve the automatic triage function, the WIGO system queries a network element's internal states and databases to identify issues related to a problem in the network. In one example, the WIGO system may automatically detect a misconfiguration or detect internal communication issues between software modules.

Figure 1:
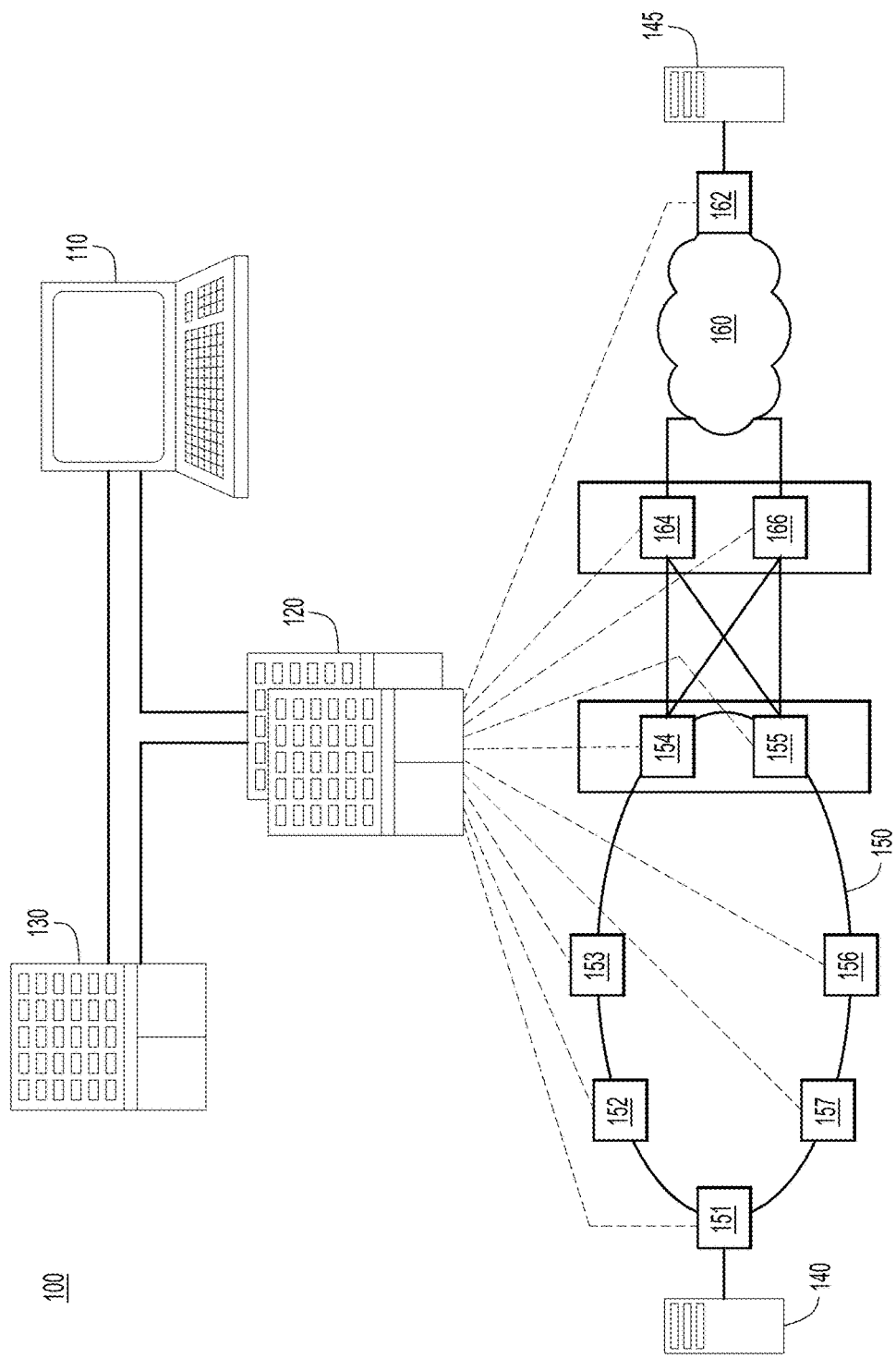
FIG. 1 is a system diagram of a client device and management server with connections to troubleshoot network issues, according to an example embodiment.

Referring first to FIG. 1, a WIGO system 100 is shown that includes a user device 110, a WIGO management server 120, and a WIGO storage system 130. The WIGO system 100 monitors a computer network between endpoint 140 and endpoint 145. Endpoint 140 is connected to an edge network 150 through network element 151. The edge network 150 further includes network elements 152, 153, 154, 155, 156, and 157. Endpoint 145 is connected to a core network 160 through edge node 162. Networks 150 and 160 are connected through network elements 154 and 155 communicating with edge nodes 164 and 166. The WIGO management server 120 may be connected to networks 150 and/or 160. This connection allows the WIGO system 100 to log in to any of the network elements in networks 150 and/or 160.

In one example, more or fewer network elements, endpoint clients, WIGO management servers may be included in WIGO system 100. Multiple management servers may maintain connections into different networks for speed or security reasons. Networks 150 and 160 may include one or more types of computer networks, such as wired, wireless, intranet, internet, local area networks, wide are networks, and may include on or more of Fiber Channel, Ethernet, Multiprotocol Label Switching (MPLS), or Frame Relay network elements.

In another example, the WIGO storage system 130 comprises a database system that stores information related to the monitored network, including data on issues that have occurred in the network. The data may be accessed by the WIGO management server 120 or by the user device 110. The stored data may be imported/exported using Resource Description Framework (RDF) or other formats. In one example, the WIGO storage system 130 may store statistics on when WIGO commands are used and which service the WIGO system determines to be the source of the issue.

Figure 2:
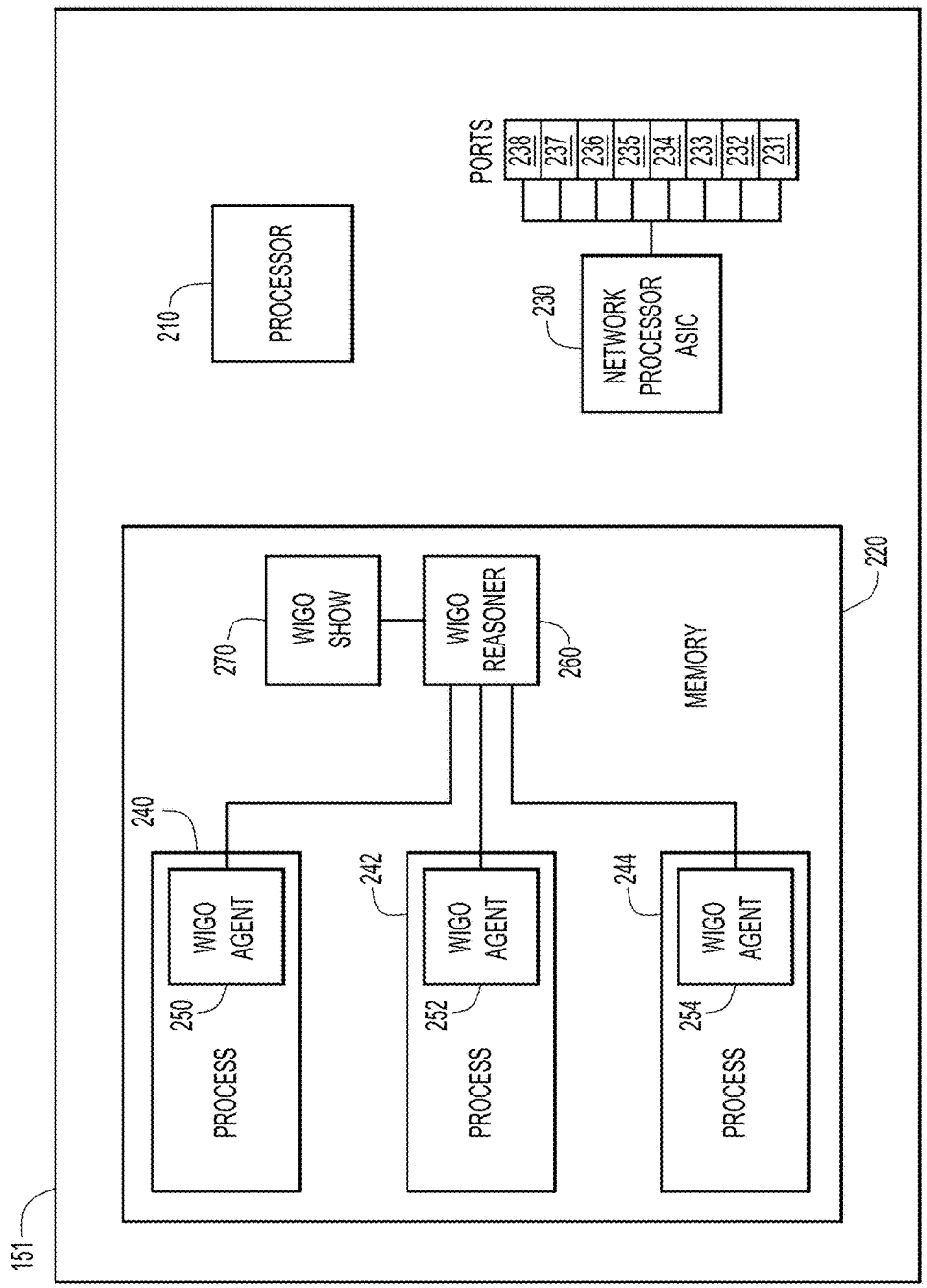
FIG. 2 is a block diagram of a network element according to an example embodiment.

Referring now to FIG. 2, a network element 151 is shown that includes the WIGO elements used to capture internal data and process the data to identify any issues. The network element 151 includes, among other possible components, a processor 210 to process instructions relevant to routing network traffic and troubleshooting network issues, and a memory 220 to store a variety of data and software instructions (e.g., processes, and modules associated with the WIGO system). The network element 151 also includes a network processor application specific integrated circuit (ASIC) 230 and network ports 231-238 to communicate with other network elements and/or user endpoints on a computer network. The network processor ASIC 230 performs one or more network functions, such as switching, routing, firewall, network address translation, etc.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Processes 240, 242, 244 (e.g., a Border Gateway Protocol (BGP) process, a Layer 2 Virtual Private Network (L2VPN) process, etc.) may be stored as source code in memory 220. The processes may be invoked in the course of handling network traffic across the network element 151. Process 240 includes a WIGO agent 250 that has access to internal states of the process 240, which may be useful in determining the source of a network issue. Similarly, processes 242 and 244 include WIGO agents 252 and 254, respectively. In one example, every process that runs on the network element 151 includes a WIGO agent to provide data from that process. Since the WIGO agents are embedded in the source code of the corresponding process, each WIGO agent can provide data on aspects of the process that are not typically visible from outside the process, such as interprocess communication status and internal handshaking protocols.

WIGO reasoner module 260 queries one or more WIGO agents when a network issue is detected, and processes the data provided by the WIGO agents to determine the likely source/cause of the network issue. In one example, the WIGO agents provide the data modeled using one or more formats (e.g., JavaScript Object Notation or Extensible Markup Language). The WIGO reasoner module 260 provides the logic analyzing the data from WIGO agents. In one example, the analysis is performed using high level language and/or an artificial intelligence engine. WIGO show module 270 outputs the result of the WIGO reasoner 260. WIGO show module 270 enables first line triage by an engineer logging in to the network element 151 directly, without the intermediate management server 120 shown in FIG. 1.

In one example, the configuration shown in FIG. 2 is part of a WIGO "on-box" system. A WIGO "on-box" system uses WIGO agents, a WIGO reasoner module, and a WIGO show module. Users, such as network operators or test engineers run a "show wigo" command directly on the network element to perform first line triage when an issue/problem occurs. In another example, the show command may be confined to a specific process. Since the WIGO agent resides within the process, the WIGO logic has access to any local data, databases, and/or cache that may be useful in identifying the issue.

One example of the output provided by the WIGO show module 270 in response to a network issue is shown below:
show wigo process A
Process A has not completed its bootup sequence
In this output message, the issue is related to the process A, and the issue is forwarded to the engineering team that is responsible for process A for further investigation and root-cause analysis. Alternatively, if the issue is caused by another process (e.g., process B) instead of process A, then the output may have been:
Process B not ready and Process A depends on it.

In this case, the issue is forwarded to the team that is responsible for process B for further investigation, and does not need to be sent to the team that is responsible for process A. Even though the issue manifested itself as an error in process A, the WIGO system determined that the actual source of the error is process B. This saves the resources from process A's team, since they do not need to spend time looking at the issue only to determine that it is not their problem and forwarding it to the other team.

Figure 3:
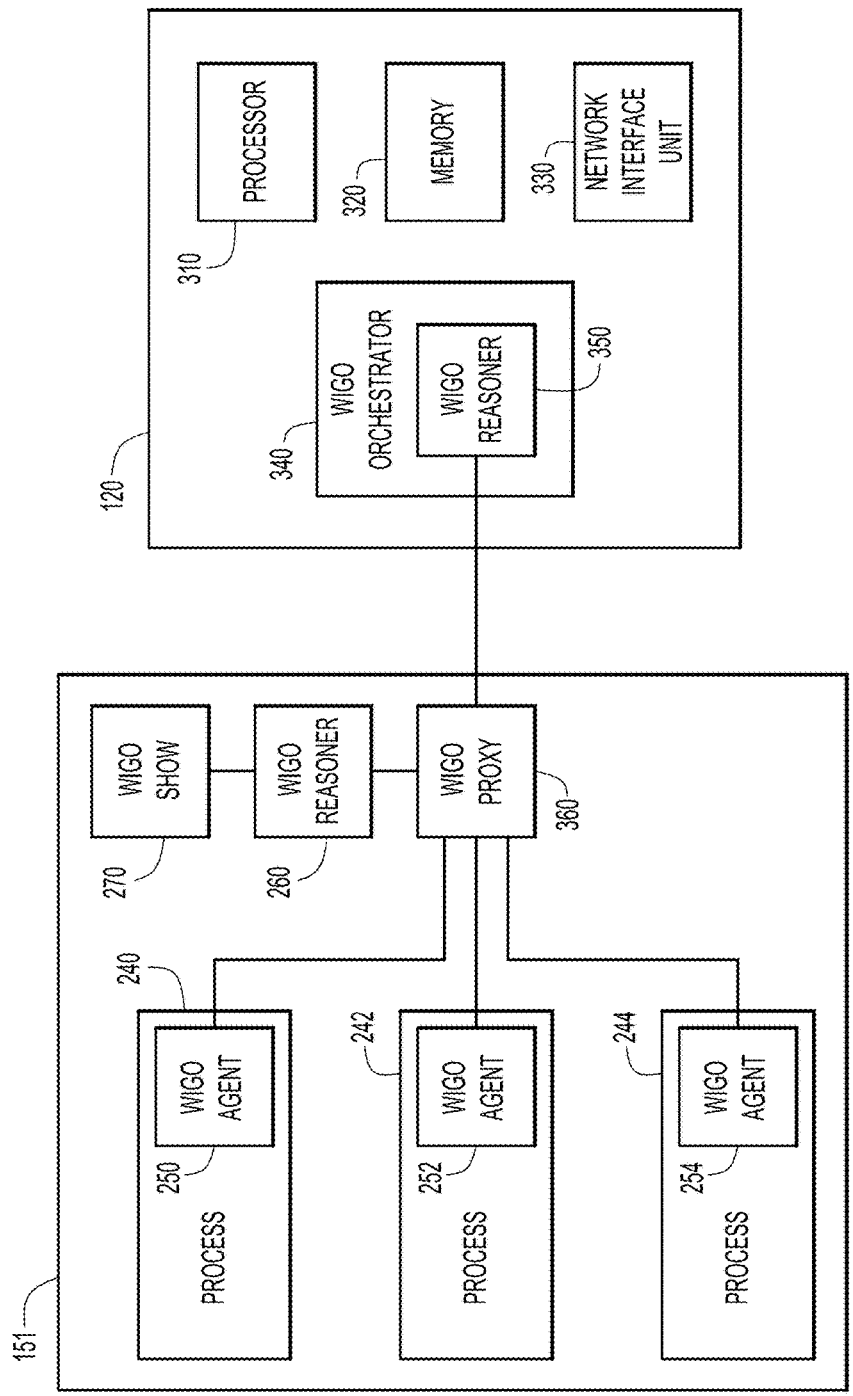
FIG. 3 is a system diagram showing interaction of a management server and network element, according to an example embodiment.

Referring now to FIG. 3, a troubleshooting system comprising a management server 120 connected to a network element 151 is shown. The management server 120 includes, among other possible components, a processor 310 to process instructions relevant to troubleshooting network issues, and a memory 320 to store a variety of data and software instructions (e.g., modules associated with the WIGO system). The management server 120 also includes a network interface unit module 330 to communicate with network elements and/or user devices on a computer network.

Memory 320 may comprise ROM, RAM, magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein.

The management server 120 enables an engineer to access network element 151 through a WIGO orchestrator module 340, which includes a WIGO reasoner module 350. The reasoner module 350 communicates with the network element 151 through a WIGO proxy module 360, which gathers data from the WIGO agents in the processes on the network element 151. The network element 151 may also include its own WIGO reasoner module 260 and a WIGO show module 270 to enable an engineer to troubleshoot network issues directly from the network element 151. In one example, the WIGO proxy module 360 may be used by the WIGO reasoner module 260 and/or the WIGO reasoner module 350 to forward queries to the appropriate process and embedded WIGO agent, and forward the data from the WIGO agent back to the WIGO reasoner module.

In one example, the system of FIG. 3 is part of what is called a WIGO "off-box" system. Here, the analysis is performed outside of the network elements, on external servers. This system uses a WIGO orchestrator and re-uses components of the WIGO "on-box" system. On the network element, each process includes a WIGO agent that is tasked to respond to WIGO orchestrator requests transmitted through a WIGO proxy module. The WIGO agent in the network element's process will capture data related to the specific query and send the data back to the WIGO orchestrator. WIGO agents do not have any logic or capability to analyze requested data. The WIGO reasoner module 350 on the WIGO orchestrator 340 analyzes the returned data, and may be assisted by an artificial intelligence engine. The WIGO reasoner module 340 has the intelligence to analyze the data coming from the WIGO agents and perform triage functions to determine the component at fault. In one example, the WIGO reasoner module 260 and the WIGO reasoner module 350 may be the same engine which is re-used for development simplicity.

In a another example, the WIGO orchestrator module may coordinate with WIGO reasoner modules on one or more network elements. This would minimize the amount of data transferred between the network element and the WIGO management server, while maintaining the WIGO system's use of the internal data provided by the WIGO agents.

In a further example, the WIGO orchestrator module may request different information from different WIGO agents to complete a full analysis. The WIGO agents may reside on the same or different network elements, providing the WIGO World system a full view of the network topology. Additionally, WIGO World algorithms and tools may continue to evolve as new intelligence is added, for example, by subject matter experts.

Figure 4:
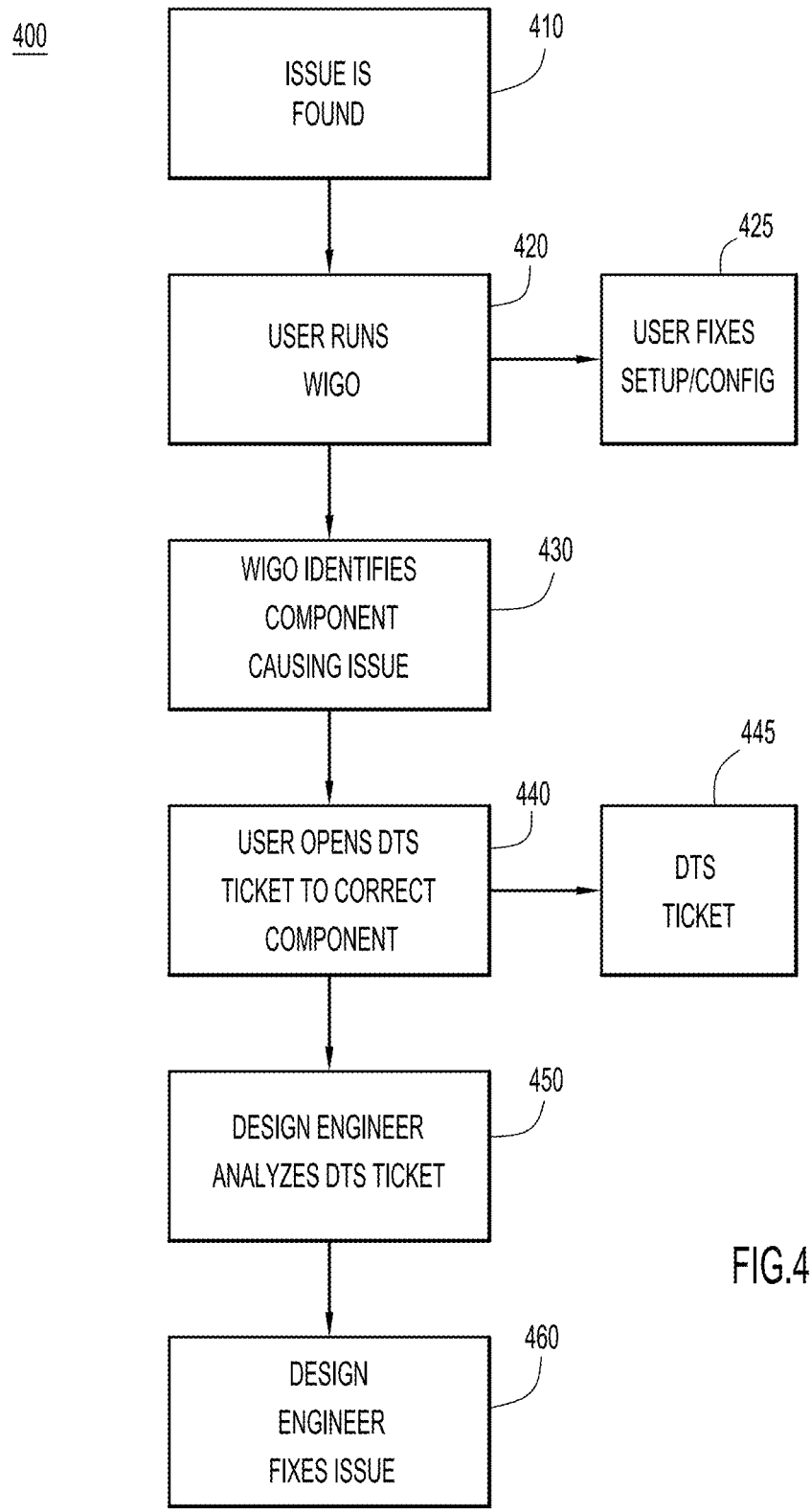
FIG. 4 is a flow chart illustrating operations to identify and solve a computer network issue, according to an example embodiment.

Referring now to FIG. 4, a process 400 is described for operations in identifying and correcting a network issue. Initially, an issue is found in a computer network at step 410. A user/operator runs the WIGO system in step 420, and if the user/operator's setup or configuration is the cause of the issue, then the issue is spelled out by the WIGO system, and the user/operator fixes it in step 425. In step 430, the WIGO system identifies the component that is causing the issue. In step 440, the user/operator opens a ticket 445 in a Defect Tracking System (DTS) for the component that is causing the issue. The design engineer who is responsible for that component analyzes the ticket to determine the root cause of the issue in step 450. Once the root cause has been determined, the design engineer fixes the issue in step 460. Time and resources are saved in process 400 by having the WIGO system accurately determine which component is causing the issue, without requiring human interaction through multiple different engineering teams.

Figure 5:
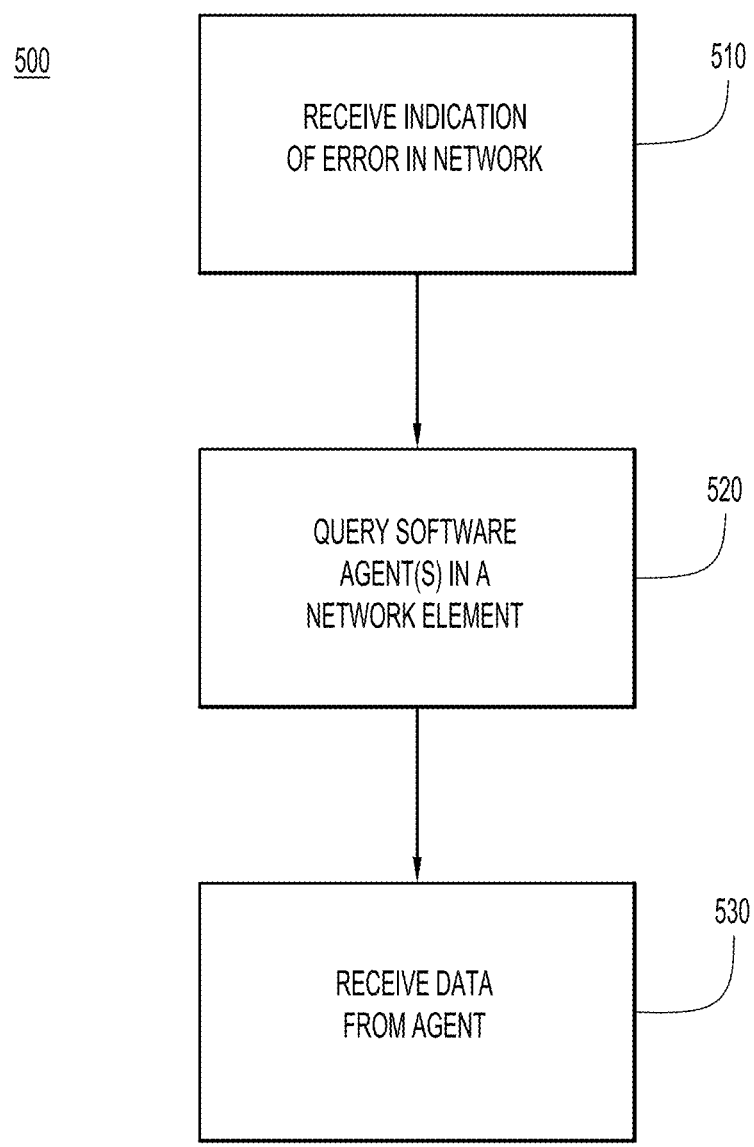
FIG. 5 is a flow chart illustrating operations to identify a computer network issue from data in an embedded agent, according to an example embodiment.

Referring now to FIG. 5, a process 500 is described for operations performed by the WIGO system in identifying the source of a network issue. In step 510, the WIGO system receives an indication of an error in the network. The indication of an error may be received by a user client using the network, by a test engineering client testing the network, or by an automated process. The system queries software agents in a network element at step 520. In step 530, the software agents return data from the processes in the network element, which allows the WIGO system to diagnose the error and determine the source of the issue. In one example, the data returned by the software agents include sensitive data that should not be transmitted off of the network element. In this example, a WIGO reasoner module on the network element processes the data, and determines the source of the issue without any sensitive information leaving the network element.

In summary, the WIGO system enables a first line triage of network issues to be performed by an intelligent module with access to data from individual processes running on the network elements. The WIGO reasoner module may be provided directly on the network element, allowing sensitive information to be used in the triage of the issue without the sensitive information leaving the network element. The WIGO agents reside within the source code of the network elements. They have visibility on the internal data structures, states, and databases, which may not be externally visible by typical debugging tools.

In one form, a method is provided for receiving an indication of an error in a computer network. At least one software agent in a network element of the computer network is queried. The software agent(s) are embedded in the source code for processes running on the network element. Data from the software agent(s) are received in response to the querying.

In another form, an apparatus is provided comprising a network interface, a memory, and a processor coupled to the memory and the network interface unit. The network interface comprises a plurality of ports and a network processor that performs networking functions in a network. The processor receives an indication of an error in the network, and queries at least one software agent in the apparatus. The software agent(s) are embedded within the source code stored in the memory for processes on the apparatus. The processor receives data from the software agent(s) in response to the querying.

In yet another form, a system is provided comprising at least one network element to carry traffic in a network and a server. The server receives an indication of an error in the network and queries at least one software agent in the network element. The software agent(s) are embedded in the source code for processes running on the network element. The network element generates data from the software agent(s) in response to the querying by the server.

The above description is intended by way of example only. Various modifications and structural changes may be made therein without departing from the scope of the concepts described herein and within the scope and range of equivalents of the claims.

What is claimed is:

1. A method comprising:
   receiving an indication of an error in a computer network;
   querying at least one software agent in a network element of the computer network, the at least one software agent being embedded in source code for corresponding processes running on the network element; and
   receiving data from the at least one software agent in response to the querying.

2. The method of claim 1, further comprising processing the data to determine a source of the error in the computer network, and generating processed data identifying the source of the error.

3. The method of claim 2, further comprising:
   determining a destination responsible for fixing the source of the error; and
   sending a message to the destination responsible for fixing the source of the error, the message including the processed data.

4. The method of claim 3, wherein the message is sent only to the destination responsible for fixing the source of the error.

5. The method of claim 1, wherein the indication of the error is received from one of a user client, a test engineering client, or an automated process.

6. The method of claim 1, wherein the data includes secure data that is not permitted to be transmitted from the network element.

7. The method of claim 1, further comprising a software agent embedded within the source code for every process running on the network element.

8. An apparatus comprising:
   a network interface comprising a plurality of ports and one or more network processors that perform networking functions in a network;
   a memory; and
   a processor coupled to the memory and the network interface, wherein the processor:
   receives, via the network interface, an indication of an error in the network;

queries at least one software agent in the apparatus, the at least one software agent being embedded in source code stored in the memory for corresponding processes; and receives data from the at least one software agent in response to the querying.

9. The apparatus of claim 8, wherein the processor processes the data to determine a source of the error in the network, and generates processed data identifying the source of the error.

10. The apparatus of claim 9, wherein the processor:
determines a destination responsible for fixing the source of the error; and
causes a message to be sent, via the network interface, to the destination responsible for fixing the source of the error, the message including the processed data.

11. The apparatus of claim 10, wherein the message is sent only to the destination responsible for fixing the source of the error.

12. The apparatus of claim 8, wherein the data includes secure data that is not permitted to be transmitted from the network element.

13. The apparatus of claim 8, wherein the processor receives the indication of the error from one of a user client, a test engineering client, or an automated process.

14. The apparatus of claim 8, further comprising a software agent embedded in the source code for every process running on the network element.

15. A system comprising:
at least one network element to carry traffic in a network; and
a server to:
receive an indication of an error in the network; and
query at least one software agent in the network element, the at least one software agent being embedded within source code for corresponding processes running on the network element;
wherein the network element generates data from the at least one software agent in response to the querying.

16. The system of claim 15, wherein the network element further processes the data to determine a source of the error in the network, and generates processed data identifying the source of the error, and wherein the server further receives the processed data in response to the querying.

17. The system of claim 16, wherein the server further:
determines a destination responsible for fixing the source of the error; and
sends a message to the destination responsible for fixing the source of the error, the message including the processed data.

18. The system of claim 17, wherein the message is sent only to the destination responsible for fixing the source of the error.

19. The system of claim 15, wherein the data includes secure data that is not permitted to be transmitted from the network element.

20. The system of claim 15, wherein the server receives the indication of the error from one of a user client, a test engineering client, or an automated process.

21. The system of claim 15, wherein the network element further comprises a software agent embedded within the source code for every process running on the network element.

* * * * *